United States Patent
Xu et al.

(10) Patent No.: US 12,088,708 B2
(45) Date of Patent: Sep. 10, 2024

(54) PHASE CODER-DECODER FOR QUANTUM KEY DISTRIBUTION, AND CORRESPONDING CODEC APPARATUS AND SYSTEM

(71) Applicant: CHINA ACADEMY OF ELECTRONICS AND INFORMATION TECHNOLOGY OF CETC, Beijing (CN)

(72) Inventors: Huaxing Xu, Beijing (CN); Changlei Wang, Beijing (CN); Ping Zhang, Beijing (CN)

(73) Assignee: China Academy of Electronics and Information Technology of CETC, Beijing (CN)

( * ) Notice: Subject to any disclaimer, the term of this patent is extended or adjusted under 35 U.S.C. 154(b) by 384 days.

(21) Appl. No.: 17/593,044

(22) PCT Filed: Mar. 5, 2020

(86) PCT No.: PCT/CN2020/078048
§ 371 (c)(1),
(2) Date: Sep. 7, 2021

(87) PCT Pub. No.: WO2020/182055
PCT Pub. Date: Sep. 17, 2020

(65) Prior Publication Data
US 2022/0173897 A1  Jun. 2, 2022

(30) Foreign Application Priority Data
Mar. 8, 2019 (CN) .......................... 201910176939.6

(51) Int. Cl.
*H04L 9/08* (2006.01)
*H04B 10/61* (2013.01)

(52) U.S. Cl.
CPC .......... *H04L 9/0858* (2013.01); *H04B 10/614* (2013.01)

(58) Field of Classification Search
CPC .... H04B 10/70; H04B 10/548; H04B 10/614; H04L 9/0858; H04L 9/0819; B82Y 10/00;
(Continued)

(56) References Cited

U.S. PATENT DOCUMENTS 6,188,768 B1 * 2/2001 Bethune ................ H04L 9/0858
380/278
8,331,797 B2 * 12/2012 Han ...................... H04L 9/0858
398/205
(Continued)

FOREIGN PATENT DOCUMENTS

CN 105116562 A 12/2015
CN 107979463 A 5/2018
(Continued)

OTHER PUBLICATIONS

Translation from WIPO of CN 107979463 (published Jan. 5, 2018; translation obtained Dec. 14, 2023) (Year: 2018).*
(Continued)

*Primary Examiner* — Sharon S Lynch
(74) *Attorney, Agent, or Firm* — Price Heneveld LLP

(57) ABSTRACT

A phase coder-decoder for quantum key distribution including a beam splitter, two reflecting devices with an orthogonal rotation of polarization optically coupled with the beam splitter via two arms, and a phase modulator provided on one of the two arms. The reflecting devices including a polarization beam splitter having an input and two output ports, and coupled to a corresponding arm via the input port, the output ports optically coupled to each other via a polarization maintaining optical fiber twisted by 90 degrees such that optical pulses output by the output ports are coupled to an
(Continued)

axis of the polarization maintaining optical fiber for transmission. The phase coder-decoder is configured to stably perform interference on input optical pulses with an arbitrary polarization state for coding and decoding purpose.

11 Claims, 3 Drawing Sheets

(58) Field of Classification Search
CPC .... B82Y 20/00; G02B 6/2753; G02B 6/2773; G02B 6/29349; G06N 10/00
See application file for complete search history.

(56) References Cited

U.S. PATENT DOCUMENTS

| | | | | |
|---|---|---|---|---|
| 8,599,385 | B2* | 12/2013 | Chen | G01J 4/00 356/477 |
| 9,041,935 | B2* | 5/2015 | Yao | G01N 21/23 356/73.1 |
| 10,724,922 | B1* | 7/2020 | Yao | G02B 6/024 |
| 2008/0037998 | A1* | 2/2008 | Zhengfu | H04L 9/0858 398/184 |
| 2008/0102544 | A1* | 5/2008 | Okada | H05K 3/303 438/26 |
| 2010/0208334 | A1* | 8/2010 | Kanter | G02F 1/3526 359/489.08 |
| 2010/0309469 | A1* | 12/2010 | Kanter | H04B 10/70 359/330 |
| 2011/0277552 | A1* | 11/2011 | Chen | G01J 4/00 356/73.1 |
| 2016/0097634 | A1* | 4/2016 | Yao | G01B 11/168 356/34 |
| 2016/0258743 | A1* | 9/2016 | Yao | G01L 1/242 |

FOREIGN PATENT DOCUMENTS

| | | |
|---|---|---|
| CN | 109039617 A | 12/2018 |
| CN | 109120403 A | 1/2019 |
| CN | 109120404 A | 1/2019 |
| CN | 109150522 A | 1/2019 |
| CN | 109150525 B | 10/2019 |
| CN | 110460427 A | 11/2019 |
| CN | 209659321 A | 11/2019 |
| CN | 109039625 A | 5/2023 |
| CN | 109104277 A | 9/2023 |

OTHER PUBLICATIONS

Translation from WIPO of CN 205961140 (published Feb. 15, 2017; translation obtained Dec. 14, 2023) (Year: 2017).*
China National Intellectual Property Administration; International Search Report; May 19, 2020.
China National Intellectual Property Administration; First Office Action, Jan. 26, 2024.

* cited by examiner

PHASE CODER-DECODER FOR QUANTUM KEY DISTRIBUTION, AND CORRESPONDING CODEC APPARATUS AND SYSTEM

CROSS-REFERENCE TO RELATED APPLICATIONS

This application is a national application of PCT/CN2020/078048, filed on Mar. 5, 2020 and claiming priority to the following application: Chinese Patent Application No. 2019101769396 filed on Mar. 8, 2019, which is incorporated herein by reference in its entirety.

FIELD OF THE INVENTION

The present invention relates to the field of secure communication technologies using optical transmission, and in particular, to a phase coder-decoder for quantum key distribution based on reflection with an orthogonal rotation of polarization, and a corresponding codec apparatus and quantum key distribution system comprising the phase coder-decoder.

BACKGROUND

Quantum secure communication technologies are a frontier hotspot field combining quantum physics with information science. Based on the quantum key distribution technology and the principle of one-time pad, quantum secure communication can realize secure transmission of information in public channels. Quantum key distribution, which is based on physical principles such as the Heisenberg uncertainty relationship of quantum mechanics, and quantum no-cloning theorem, can realize safe sharing of keys among users and detect potential eavesdropping behaviors, and can be applied in the fields of national defense, government affairs, finance, electric power and the like with high needs for secure information transmission.

Ground quantum key distribution is mainly based on optical fiber channel transmission, and because phase encoding uses a phase difference between a previous optical pulse and a next optical pulse to encode information and can be kept stable during long-distance optical fiber channel transmission, phase encoding and time-bin phase encoding based on an interferometer with unequal arms are the main encoding schemes for quantum key distribution applications. However, for fabrication of an optical fiber, there exist non-ideal conditions such as non-circular symmetry of the cross-section and uneven distribution of the fiber core's refractive index in the radial direction, and in the actual environment, an optical fiber is affected by temperature, strain, bending, etc., which will cause random birefringence effect. Therefore, after the optical pulses are transmitted via a long-distance optical fiber and are transmitted via optical fibers on two arms of the interferometer with unequal arms, there is a problem of polarization-induced fading when interference is performed through the interferometer with unequal arms for phase decoding purpose, which leads to unstable decoding interference and increased bit error rate. If a polarization correcting device is used, the system's complexity and cost will increase, and it is difficult to achieve stable use in situations with strong interference, such as those for overhead optical cables and road and bridge optical cables.

For phase encoding and time-bin phase encoding schemes for quantum key distribution, how to perform interference for decoding purpose stably and efficiently is a hotspot and difficult problem for quantum secure communication applications based on the existing optical cable infrastructure.

SUMMARY OF THE INVENTION

The main purpose of the present invention is to propose a phase coder-decoder for quantum key distribution based on reflection with an orthogonal rotation of polarization, and a corresponding codec apparatus and quantum key distribution system comprising the phase coder-decoder, so as to solve the problem of interference for phase decoding purpose being instable due to polarization-induced fading in phase encoding and time-bin phase encoding quantum key distribution applications.

The present invention provides at least the following technical solutions:

1. A phase coder-decoder for quantum key distribution, comprising: a beam splitter, and two reflecting devices optically coupled with the beam splitter via two arms, respectively, each of the reflecting devices being a reflecting device with an orthogonal rotation of polarization, and one of the two reflecting devices or each of the reflecting devices comprising a polarization beam splitter having an input port and two output ports, and being coupled to a corresponding arm of the two arms via the input port of the polarization beam splitter, wherein the two output ports of each polarization beam splitter are optically coupled to each other via a transmission optical path, and for at least one reflecting device comprising a polarization beam splitter: its transmission optical path is formed by a polarization maintaining optical fiber that is twisted by 90 degrees, so that optical pulses output by the two output ports of its polarization beam splitter are both coupled to the slow axis of the polarization maintaining optical fiber for transmission or are both coupled to the fast axis of the polarization maintaining optical fiber for transmission.

2. The phase coder-decoder according to solution 1, wherein the two reflecting devices are reflecting devices with an orthogonal rotation of polarization that are the same in structure, or are reflecting devices with an orthogonal rotation of polarization that are different in structure.

3. The phase coder-decoder according to solution 1, wherein the polarization maintaining optical fiber that is twisted by 90 degrees comprises a polarization maintaining optical fiber that is twisted by 90 degrees or is twisted by (90+n*180) degrees, where n is an integer.

4. The phase coder-decoder according to solution 1, wherein the beam splitter is a polarization maintaining beam splitter.

5. The phase coder-decoder according to solution 1, wherein each of the two arms is a polarization maintaining optical path, and optical devices on the two arms are polarization maintaining optical devices and/or non-birefringent optical devices.

6. The phase coder-decoder according to any one of solutions 1 to 5, wherein the phase coder-decoder further comprises phase modulator(s), wherein the phase modulator(s) is provided at a front end of the beam splitter or is provided on at least one of the two arms.

7. A phase codec apparatus for quantum key distribution using DC modulation, comprising a pre beam splitter and two phase coder-decoders according to any one of solutions 1 to 6, the two phase coder-decoders being optically coupled to the pre beam splitter via two sub optical paths, respectively, wherein one of ports of the beam splitter of each of the phase coder-decoders that are not coupled to the two arms of the phase coder-decoder is optically coupled to a corresponding sub optical path of the two optical paths, and each of the sub optical paths is provided with an optical circulator thereon.

8. A time-bin phase codec apparatus for quantum key distribution, comprising a pre beam splitter and one phase coder-decoder according to any one of solutions 1 to 6, the phase coder-decoder being optically coupled to the pre beam splitter via one sub optical path, wherein one of ports of the beam splitter of the phase coder-decoder that are not coupled to the two arms is optically coupled to the one sub optical path.

9. A time-bin phase codec apparatus for quantum key distribution using DC modulation, comprising a pre beam splitter and one phase coder-decoder according to any one of solutions 1 to 6, the phase coder-decoder being optically coupled to the pre beam splitter via one sub optical path, wherein one of ports of the beam splitter of the phase coder-decoder that are not coupled to the two arms is optically coupled to the one sub optical path, wherein the one sub optical path is provided with an optical circulator thereon.

10. The codec apparatus according to solution 8 or 9, further comprising a beam splitter that is coupled to the pre beam splitter via another sub optical path.

11. A quantum key distribution system, comprising:
the phase coder-decoder according to any one of solutions 1 to 6 or the codec apparatus according to any one of solutions 7 to 10, provided on a receiving end of the quantum key distribution system for decoding; and/or
the phase coder-decoder according to any one of solutions 1 to 6 or the codec apparatus according to any one of solutions 7 to 10, provided on a transmitting end of the quantum key distribution system for encoding.

Through a creative structure, the present invention makes it possible to stably perform interference on an input optical pulse of an arbitrary polarization state for coding and decoding purpose, thereby achieving unexpected beneficial effect. With the solution of the present invention, for an input optical pulse of an arbitrary polarization state, stable interference and output at the phase decoding interferometer can be realized, and the problem that the system cannot work stably due to polarization-induced fading in phase encoding and time-bin phase encoding quantum key distribution applications is solved. The present invention provides a decoding scheme for phase encoding and time-bin phase encoding quantum key distribution that is easy to implement and apply and resists polarization-induced fading.

DETAILED DESCRIPTION OF THE EMBODIMENTS

In the following, preferred embodiments of the present invention are described in detail in conjunction with the accompanying figures, which form a part of the present application and are used together with the embodiments of the present invention to set forth the principle of the present invention. For clarity and simplification, a detailed concrete description of the known function and structure of the devices described herein will be omitted, when it may obscure the subject matter of the present invention.

Figure 1:
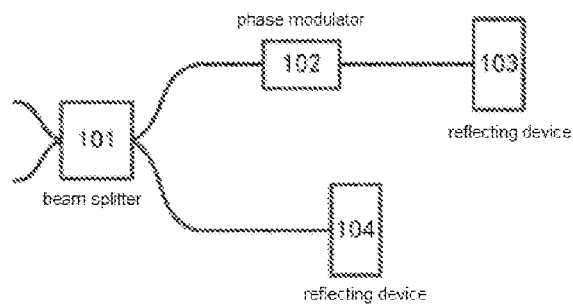
FIG. 1 is a schematic diagram of composition and structure of a phase coder-decoder for quantum key distribution based on reflection with an orthogonal rotation of polarization of a preferred embodiment of the present invention.

A phase coder-decoder for quantum key distribution based on reflection with an orthogonal rotation of polarization of a preferred embodiment of the present invention is as shown in FIG. 1, and comprises the following components: a beam splitter 101, a phase modulator 102, and two reflecting devices 103 and 104.

The two reflecting devices 103 and 104 are optically coupled with the beam splitter 101 via two arms (the upper and lower arms in FIG. 1), respectively. The phase modulator 102 is inserted into one of the two arms (which is the upper arm in FIG. 1).

According to the present invention, the two reflecting devices 103 and 104 are both reflecting devices with an orthogonal rotation of polarization.

Here, a reflecting device with an orthogonal rotation of polarization refers to a reflecting device that can perform reflection with an orthogonal rotation of polarization on two orthogonal polarization states of an optical pulse that it reflects, that is, that when reflecting an incident optical pulse, transforms each orthogonal polarization state of the optical pulse to a polarization state orthogonal thereto. For example, assuming that the two orthogonal polarization states are x polarization state and y polarization state respectively, the x polarization state transmitted along an optical path to a reflecting device with an orthogonal rotation of polarization, after undergoing reflection with an orthogonal rotation of polarization at the reflecting device, is transformed to a polarization state which is orthogonal to it, i.e., the y polarization state, and the y polarization state transmitted along the optical path to the reflecting device, after undergoing reflection with an orthogonal rotation of polarization at the reflecting device, is transformed to a polarization state which is orthogonal to it, i.e., the x polarization state.

The beam splitter 101 is used for splitting one incident input optical pulse of any polarization state into two optical pulses for transmission along two arms respectively.

The two arms are used for transmitting the two optical pulses respectively.

The phase modulator 102 is used for performing a phase modulation on an optical pulse transmitted by the arm on which it is located (i.e., one of the two optical pulses) according to a quantum key distribution protocol. The phase modulation performed by the phase modulator 102 is determined by the quantum key distribution protocol, depending on the specific application. For example, in one possible application, the phase modulator 102 may randomly modulate a 0 degree phase or a 90 degree phase.

The phase modulator 102 may be a polarization independent phase modulator or a birefringent phase modulator. The birefringent phase modulator is suitable for applying different adjustable phase modulation to two orthogonal polarization states passing through it. For example, the birefringent phase modulator may be a lithium niobate phase modulator, and by controlling a voltage applied to the lithium niobate crystal, may control and adjust the phase modulation undergone by each of the two orthogonal polarization states passing through the lithium niobate phase modulator.

The reflecting devices 103 and 104 are respectively used for reflecting the two optical pulses transmitted by the two arms from the beam splitter 101 back to the beam splitter 101 to be combined and output by the beam splitter 101.

Since the two reflecting devices 103 and 104 are both reflecting devices with an orthogonal rotation of polarization, for each of the two optical pulses: when the optical pulse is reflected by a corresponding reflecting device of the two reflecting devices, two orthogonal polarization states of the optical pulse are reflected with an orthogonal rotation of polarization, so that each orthogonal polarization state of the optical pulse, after being reflected by the corresponding reflecting device, is transformed to a polarization state orthogonal thereto. In this way, for the phase coder-decoder of FIG. 1, using the reflection with an orthogonal rotation of polarization at the reflecting device with an orthogonal rotation of polarization, a phase difference of the x polarization state of the input optical pulse as a result of being transmitted by the two arms in the process of beam splitting by the beam splitter to beam combining by the beam splitter is exactly equal to a phase difference of the y polarization state of the optical pulse as a result of being transmitted by the two arms in the process of beam splitting by the beam splitter to beam combining by the beam splitter.

Although in FIG. 1 only one phase modulator 102 is shown as being provided on one of the two arms, it is also possible to provide one phase modulator on each of the two arms. In the case of two phase modulators being provided in this way, a difference between phases modulated by the two phase modulators is determined by the quantum key distribution protocol, depending on the specific application. In addition, instead of providing phase modulator(s) on one or both of the two arms, a phase modulator can be provided before the beam splitter 101 for performing a phase modulation on the input optical pulse before beam splitting according to the quantum key distribution protocol, or performing phase modulation on an output optical pulse after beam combining according to the quantum key distribution protocol.

The present invention proposes three creative structures for a reflecting device with an orthogonal rotation of polarization, namely, structure 1, structure 2, and structure 3 described in the following.

According to structure 1, the reflecting device with an orthogonal rotation of polarization comprises a polarization beam splitter, which has an input port and two output ports, the two output ports of the polarization beam splitter are optically coupled to each other via a transmission optical path, the transmission optical path is formed by a polarization maintaining optical fiber, and the transmission optical path is provided thereon with a half-wave plate, and an included angle between a polarization direction of an optical pulse input to the half-wave plate and the fast or slow axis of the half-wave plate is 45 degrees. When used in the phase coder-decoder of the present invention, the reflecting device with an orthogonal rotation of polarization having structure 1 can be coupled to one arm of the phase coder-decoder by coupling the input port of its polarization beam splitter to the one arm.

According to structure 2, the reflecting device with an orthogonal rotation of polarization comprises a polarization beam splitter, which has an input port and two output ports, the two output ports of the polarization beam splitter are optically coupled to each other via a transmission optical path, the transmission optical path is formed by a polarization maintaining optical fiber, and the slow axis and fast axis of the polarization maintaining optical fiber respectively maintain stable transmission of two orthogonal polarization states of an optical pulse input to the polarization maintaining optical fiber, that is, the polarization states are not changed, and the two output ports of the polarization beam splitter and the polarization maintaining optical fiber are structured so that, optical pulses output by the two output ports of the polarization beam splitter are both coupled to the slow axis of the polarization maintaining optical fiber for transmission or are both coupled to the fast axis of the polarization maintaining optical fiber for transmission. Here, the optical pulses output by the two output ports of the polarization beam splitter being both coupled to the slow axis of the polarization maintaining optical fiber for transmission or being both coupled to the fast axis of the polarization maintaining optical fiber for transmission can be realized by twisting the polarization maintaining optical fiber by 90 degrees or (90+n*180) degrees, where n is an integer. No matter whether the polarization maintaining optical fiber is twisted or not, an optical pulse that is input from the slow axis of the polarization maintaining optical fiber is always transmitted along the slow axis (being transmitted stably along the slow axis), and an optical pulse that is input from the fast axis of the polarization maintaining optical fiber is always transmitted along the fast axis (being transmitted stably along the fast axis). When used in the phase coder-decoder of the present invention, the reflecting device with an orthogonal rotation of polarization having structure 2 can be coupled to one arm of the phase coder-decoder by coupling the input port of its polarization beam splitter to the one arm.

According to structure 3, the reflecting device with an orthogonal rotation of polarization comprises a polarization beam splitter, which has an input port and two output ports, the two output ports of the polarization beam splitter are optically coupled to each other via a transmission optical path, the transmission optical path is formed by a polarization maintaining optical fiber including an odd number of 90-degree welding points, and each 90-degree welding point is formed by aligning and fusing a polarization maintaining optical fiber's slow axis and a polarization maintaining optical fiber's fast axis. When used in the phase coder-decoder of the present invention, the reflecting device with an orthogonal rotation of polarization having structure 3 can be coupled to one arm of the phase coder-decoder by coupling the input port of its polarization beam splitter to the one arm.

Returning to the phase coder-decoder of FIG. 1, at least one of the reflecting devices 103 and 104 may be a reflecting device with an orthogonal rotation of polarization adopting one of the above structures 1, 2 and 3. When one of the reflecting devices 103 and 104 is a reflecting device with an orthogonal rotation of polarization adopting one of the above structures 1, 2 and 3, the other reflecting device may be a reflecting device with an orthogonal rotation of polarization adopting one of the above structures 1, 2 and 3 too, or may be a reflecting device with an orthogonal rotation of polarization that is of other structures. The reflecting device with an orthogonal rotation of polarization that is of other structures may be, for example, a reflecting mirror with a quarter-wave plate. The "reflecting mirror with a quarter-wave plate" comprises a reflecting mirror and a quarter-wave plate, and the reflecting mirror is integrally formed with the quarter-wave plate at a rear end of the quarter-wave plate, wherein an included angle between a polarization direction of one of the two orthogonal polarization states of an optical pulse input to the quarter-wave plate and the fast axis or slow axis of the quarter-wave plate is 45 degrees. The reflecting mirror with a quarter-wave plate may be realized by plating a reflecting mirror on a crystal surface of a quarter-wave plate, or by plating a reflecting mirror on an end surface of a polarization maintaining optical fiber with a 90-degree difference in phase of transmission between fast and slow axes.

For the phase coder-decoder of FIG. 1, a relative time delay of the above two optical pulses may be realized by adjusting a length of the two arms and/or adjusting a transmission optical path in one or two reflecting devices adopting a structure selected from structure 1, structure 2 and structure 3 of the two reflecting devices 103 and 104.

In the case where the reflecting device adopts a structure selected from structure 1, structure 2 and structure 3, the two arms of the phase coder-decoder may be configured as polarization maintaining optical paths, for example, polarization maintaining optical fiber optical paths, and the optical devices on the two arms may be configured as polarization maintaining optical devices and/or non-birefringent optical devices. In this way, for each of the two optical pulses obtained by beam splitting: the two orthogonal polarization states of the optical pulse may be kept unchanged during the beam splitting by the beam splitter to reflecting by the corresponding reflecting device, and kept unchanged during the reflecting by the corresponding reflecting device to the beam combining by the beam splitter. Generally, a polarization maintaining optical path may be a free space optical path or a polarization maintaining optical fiber optical path. Herein, a "non-birefringent optical device" refers to an optical device having the same refractive index for different polarization states (for example, two orthogonal polarization states). In addition, a polarization maintaining optical device may also be referred to as a polarization-maintaining optical device.

Furthermore, the beam splitter 101 of the phase coder-decoder may be a polarization maintaining beam splitter.

Figure 2:
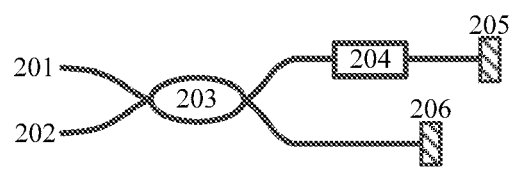
FIG. 2 is a schematic diagram of composition and structure of a phase coder-decoder for quantum key distribution based on reflection with an orthogonal rotation of polarization of another preferred embodiment of the present invention.

A phase coder-decoder of another preferred embodiment of the present invention is as shown in FIG. 2, and comprises the following components: a polarization maintaining beam splitter 203, a phase modulator 204, and reflecting devices with an orthogonal rotation of polarization 205 and 206.

One of two ports 201 and 202 on one side of the polarization maintaining beam splitter 203 is used as an input port of the phase coder-decoder. The polarization maintaining beam splitter 203 and the reflecting devices with an orthogonal rotation of polarization 205 and 206 form a Michelson interferometer with unequal arms, and two arms between them are polarization maintaining optical fiber optical paths. The phase modulator 204 is inserted into either of the two arms of the Michelson interferometer with unequal arms. The port 201 or 202 of the polarization maintaining beam splitter 203 can be used as an output port of the phase coder-decoder.

In operation, an optical pulse enters the polarization maintaining beam splitter 203 via the port 201 or 202 of the polarization maintaining beam splitter 203 and is split into two optical pulses by the polarization maintaining beam splitter 203. One optical pulse from the polarization maintaining beam splitter 203, after undergoing a phase modulation performed by the phase modulator 204, is reflected back by the reflecting device with an orthogonal rotation of polarization 205, and another optical pulse is directly transmitted to the reflecting device with an orthogonal rotation of polarization 206 via a polarization maintaining optical fiber and reflected back by the reflecting device with an orthogonal rotation of polarization 206. The two optical pulses with a relative time delay applied thereto that are reflected back are combined by the polarization maintaining beam splitter 203 and then output by the port 201 or 202.

In the case where the input port and one of output ports of the polarization maintaining beam splitter 203 are the same port, the phase coder-decoder may further comprise an optical circulator. The optical circulator may be located at a front end of the polarization maintaining beam splitter 203. One incident input optical pulse of an arbitrary polarization state may be input from a first port of the optical circulator and output from a second port of the optical circulator to the polarization maintaining beam splitter 203, and the combined output from the polarization maintaining beam splitter 203 is input to the second port of the optical circulator and output from a third port of the optical circulator.

Figure 3:
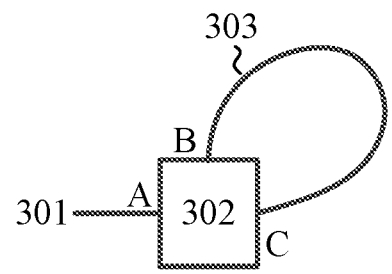
FIG. 3 is a schematic diagram of composition and structure of a reflecting device with an orthogonal rotation of polarization which can be used for the phase coder-decoder of the present invention.

FIG. 3 shows a schematic diagram of composition and structure of a reflecting device with an orthogonal rotation of polarization which can be used for the phase coder-decoder of the present invention.

The reflecting device with an orthogonal rotation of polarization shown in FIG. 3 comprises the following components: a polarization beam splitter 302 and a polarization maintaining optical fiber 303.

The polarization beam splitter 302 comprises three ports: port A, port B, and port C. Port A, port B and port C may be referred to as an input port, a first output port, and a second output port respectively. A port 301 connected to port A of the polarization beam splitter 302 is used as both an input port of the reflecting device and an output port of the reflecting device. Port B and port C of the polarization beam splitter 302 are connected via the polarization maintaining optical fiber 303. Optical pulses output by port B and port C of the polarization beam splitter 302 are both coupled to the slow axis of the polarization maintaining optical fiber 303 for transmission or are both coupled to the fast axis of the polarization maintaining optical fiber for transmission.

In operation, an input optical pulse is input to the polarization beam splitter 302 via the port 301, i.e., port A of the polarization beam splitter 302. The input optical pulse can be regarded as being formed by two orthogonal polarization states, which can be denoted as x polarization state and y polarization state respectively. The polarization beam splitter 302 polarizes the input optical pulse and splits it into a first optical pulse of x polarization state and a second optical pulse of y polarization state, so as to be output by port B and port C of the polarization beam splitter 302 respectively. The first optical pulse of x polarization state output by port B of the polarization beam splitter 302 is coupled to the slow axis of the polarization maintaining optical fiber 303 for transmission and transmitted to port C of the polarization beam splitter 302 along the slow axis of the polarization maintaining optical fiber 303, at port C, the first optical pulse is coupled to the polarization beam splitter 302 by the slow axis of the polarization maintaining optical fiber 303, and the polarization state of the first optical pulse coupled to port C of the polarization beam splitter 302 is y polarization state; and the first optical pulse of y polarization state is output by port A of the polarization beam splitter 302. That is, it is realized that a component of x polarization state of the input optical pulse input by port A is transformed to y polarization state when it is output by port A after being reflected by the reflecting device. The second optical pulse of y polarization state output by port C of the polarization beam splitter 302 is coupled to the slow axis of the polarization maintaining optical fiber 303 for transmission and transmitted to port B of the polarization beam splitter 302 along the slow axis of the polarization maintaining optical fiber 303, at port B, the second optical pulse is coupled to the polarization beam splitter 302 by the slow axis of the polarization maintaining optical fiber 303, and the polarization state of the second optical pulse coupled to port B of the polarization beam splitter 302 is x polarization state; and the second optical pulse of x polarization state is output by port A of the polarization beam splitter 302. That is, it is realized that a component of y polarization state of the input optical pulse input by port A is transformed to x polarization state when it is output by port A after being reflected by the reflecting device. By the reflecting device, it is realized that when the two orthogonal polarization states of the input optical pulse are reflected and output by the reflecting device, each orthogonal polarization state is transformed to a polarization state orthogonal thereto. The above polarization maintaining optical fiber 303 is used to perform an orthogonal rotation of polarization on the two orthogonal polarization states, so that the phase between the x polarization state and the y polarization state of the input optical pulse is kept the same as the phase between the y polarization state and x polarization state of the output optical pulse.

Port B and port C of the polarization beam splitter 302 can be both coupled to the fast axis of the polarization maintaining optical fiber 303, and the above results are not affected.

Figure 4:
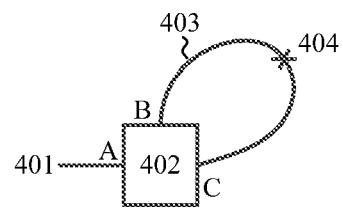
FIG. 4 is a schematic diagram of composition and structure of another reflecting device with an orthogonal rotation of polarization which can be used for the phase coder-decoder of the present invention.

FIG. 4 shows a schematic diagram of composition and structure of another reflecting device with an orthogonal rotation of polarization which can be used for the phase coder-decoder of the present invention.

The reflecting device with an orthogonal rotation of polarization shown in FIG. 4 comprises the following components: a polarization beam splitter 402, a polarization maintaining optical fiber 403, and a 90-degree welding point 404.

The polarization beam splitter 402 comprises three ports: port A, port B, and port C. Port A, port B and port C may be referred to as an input port, a first output port, and a second output port respectively. A port 401 connected to port A of the polarization beam splitter 402 is used as both an input port of the device and an output port of the device. Port B and port C of the polarization beam splitter 402 are connected via the polarization maintaining optical fiber 403. An optical pulse output by port B of the polarization beam splitter 402 is coupled to the slow axis of the polarization maintaining optical fiber 403 and an optical pulse output by port C of the polarization beam splitter 402 is coupled to the fast axis of the polarization maintaining optical fiber 403, or the optical pulse output by port B of the polarization beam splitter 402 is coupled to the fast axis of the polarization maintaining optical fiber 403 and the optical pulse output by port C of the polarization beam splitter 402 is coupled to the slow axis of the polarization maintaining optical fiber 403. The polarization maintaining optical fiber 403 includes the 90-degree welding point 404, and the 90-degree welding point 404 is formed by aligning and fusing a polarization maintaining optical fiber's slow axis and a polarization maintaining optical fiber's fast axis.

In operation, an input optical pulse is input to the polarization beam splitter 402 via the port 401, i.e., port A of the polarization beam splitter 402. The input optical pulse can be regarded as being formed by two orthogonal polarization states, which can be denoted as x polarization state and y polarization state respectively. The polarization beam splitter 402 polarizes the input optical pulse and splits it into a first optical pulse of x polarization state and a second optical pulse of y polarization state, so as to be output by port B and port C of the polarization beam splitter 402 respectively. The first optical pulse of x polarization state output by port B of the polarization beam splitter 402 is coupled to the slow axis of the polarization maintaining optical fiber 403 and transmitted to the 90-degree welding point 404, and after passing through the 90-degree welding point 404, is transmitted to port C of the polarization beam splitter 402 along the fast axis of the polarization maintaining optical fiber 404, and at port C, the first optical pulse is coupled to the polarization beam splitter 402 by the fast axis of the polarization maintaining optical fiber 403; and the polarization state of the first optical pulse coupled to port C of the polarization beam splitter 402 is y polarization state, and the first optical pulse of y polarization state is output by port A of the polarization beam splitter 402. That is, it is realized that a component of x polarization state of the input optical pulse input by port A is transformed to y polarization state when it is output by port A after being reflected by the device. The second optical pulse of y polarization state output by port C of the polarization beam splitter 402 is coupled to the fast axis of the polarization maintaining optical fiber 403 and transmitted to the 90-degree welding point 404, and after passing through the 90-degree welding point 404, is transmitted to port B of the polarization beam splitter 402 along the slow axis of the polarization maintaining optical fiber 403, and at port B, the second optical pulse is coupled to the polarization beam splitter 402 by the slow axis of the polarization maintaining optical fiber 403; and the polarization state of the second optical pulse coupled to port B of the polarization beam splitter 402 is x polarization state, and the second optical pulse of x polarization state is output by port A of the polarization beam splitter 402. That is, it is realized that a component of y polarization state of the input optical pulse input by port A is transformed to x polarization state when it is output by port A after being reflected by the device. By the reflecting device with an orthogonal rotation of polarization, it is realized that when the two orthogonal polarization states of the input optical pulse are reflected and output by the device, each orthogonal polarization state is transformed to a polarization state orthogonal thereto.

Although only one 90-degree welding point 404 is shown in FIG. 4, this is only exemplary, and the polarization maintaining optical fiber 403 may include any odd number of 90-degree welding points. Each 90-degree welding point is formed by aligning and fusing a polarization maintaining optical fiber's slow axis and a polarization maintaining optical fiber's fast axis. In the case where the polarization maintaining optical fiber 403 includes an odd number of 90-degree welding points whose number is larger than one, the above results are not affected, except that when each of the first optical pulse and the second optical pulse output by port B and port C of the polarization beam splitter 402 is transmitted along the polarization maintaining optical fiber 403, it transitions between being transmitted along the slow axis of the polarization maintaining optical fiber and being transmitted along the fast axis of the polarization maintaining optical fiber more times, and the number of times of transition is equal to the number of the 90-degree welding points.

The above polarization maintaining optical fiber 403 including an odd number of 90-degree welding points is used to perform an orthogonal rotation of polarization on the two orthogonal polarization states, so that the phase between the x polarization state and the y polarization state of the input optical pulse is kept the same as the phase between the y polarization state and the x polarization state of the output optical pulse.

When port B of the polarization beam splitter 402 is coupled to the fast axis of the polarization maintaining optical fiber 403 and port C of the polarization beam splitter 402 is coupled to the slow axis of the polarization maintaining optical fiber 403, the above results are not affected.

Figure 5:
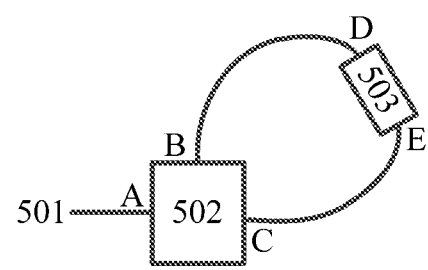
FIG. 5 is a schematic diagram of composition and structure of another reflecting device with an orthogonal rotation of polarization which can be used for the phase coder-decoder of the present invention.

FIG. 5 shows a schematic diagram of composition and structure of another reflecting device with an orthogonal rotation of polarization which can be used for the phase coder-decoder of the present invention.

The reflecting device with an orthogonal rotation of polarization shown in FIG. 5 comprises the following components: a polarization beam splitter 502, and a half-wave plate 503.

The polarization beam splitter 502 comprises three ports: port A, port B, and port C. Port A, port B, and port C may be referred to as an input port, a first output port, and a second output port respectively. A port 501 connected to port A of the polarization beam splitter 502 is used as both an input port of the device and an output port of the device. Port B of the polarization beam splitter 502 is connected with port D of the half-wave plate 503 via a transmission optical path, and port C of the polarization beam splitter 502 is connected with port E of the half-wave plate 503 via a transmission optical path. The transmission optical path connecting port B of the polarization beam splitter 502 with port D of the half-wave plate 503 and the transmission optical path connecting port C of the polarization beam splitter 502 with port E of the half-wave plate 503 are both polarization maintaining optical paths, for example, polarization maintaining optical fiber optical paths. An included angle between a polarization direction of a polarization state of optical pulses input to the half-wave plate 503 by port D and port E of the half-wave plate 503 and the slow axis or the fast axis of the half-wave plate 503 is 45 degrees.

In operation, the input optical pulse is input to the polarization beam splitter 502 via the port 501, i.e., port A of the polarization beam splitter 502. The input optical pulse can be regarded as being formed by two orthogonal polarization states, which can be denoted as x polarization state and y polarization state respectively. The polarization beam splitter 502 polarizes the input optical pulse and splits it into a first optical pulse of x polarization state and a second optical pulse of y polarization state, so as to be output by port B and port C of the polarization beam splitter 502 respectively. The first optical pulse of x polarization state output by port B of the polarization beam splitter 502 is transmitted to the half-wave plate 503, and the polarization state of the first optical pulse after undergoing an orthogonal rotation of polarization performed by the half-wave plate 503 is transformed to y polarization state. The first optical pulse of y polarization state output by port E of the half-wave plate 503 is transmitted to port C of the polarization beam splitter and input to the polarization beam splitter 502, and output by port A of the polarization beam splitter 502. In this way, it is realized that a component of x polarization state of the input optical pulse input by port A is transformed to y polarization state when it is output by port A after being reflected by the device. The second optical pulse of y polarization state output by port C of the polarization beam splitter 502 is transmitted to the half-wave plate 503, and the polarization state of the second optical pulse after undergoing an orthogonal rotation of polarization performed by half-wave plate 503 is transformed to x polarization state. The second optical pulse of x polarization state output by port D of the half-wave plate 503 is transmitted to port B of the polarization beam splitter and input to the polarization beam splitter 502, and output by port A of the polarization beam splitter 502. In this way, it is realized that a component of y polarization state of the input optical pulse input by port A is transformed to x polarization state when it is output by port A after being reflected by the device. By the reflecting device with an orthogonal rotation of polarization, it is realized that when the two orthogonal polarization states of the input optical pulse are reflected and output by the device, each orthogonal polarization state is transformed to a polarization state orthogonal thereto. The half-wave plate 503 is used to perform an orthogonal rotation of polarization on the two orthogonal polarization states, so that the phase between the x polarization state and the y polarization state of the input optical pulse is kept the same as the phase between the y polarization state and the x polarization state of the output optical pulse.

The phase coder-decoder of the present invention can be used as a component of a phase codec apparatus for quantum key distribution using DC modulation, a component of a time-bin phase codec apparatus for quantum key distribution, or a component of a time-bin phase codec apparatus for quantum key distribution using DC modulation.

Figure 6:
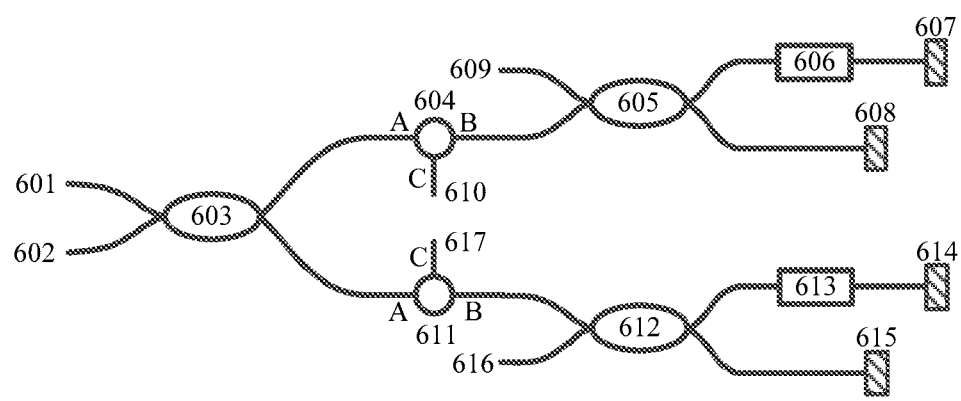
FIG. 6 is a schematic diagram of composition and structure of a phase codec apparatus for quantum key distribution using DC modulation based on reflection with an orthogonal rotation of polarization of a preferred embodiment of the present invention.

A phase codec apparatus for quantum key distribution using DC modulation based on reflection with an orthogonal rotation of polarization that uses the phase coder-decoder of the present invention is as shown in FIG. 6, and comprises the following components: a pre beam splitter 603, optical circulators 604 and 611, polarization maintaining beam splitters 605 and 612, DC phase modulators 606 and 613, and reflecting devices with an orthogonal rotation of polarization 607, 608, 614, and 615.

The polarization maintaining beam splitter 605, two reflecting devices with an orthogonal rotation of polarization 607 and 608, and two arms between the polarization maintaining beam splitter 605 and the two reflecting devices with an orthogonal rotation of polarization form a first polarization maintaining Michelson interferometer with unequal arms, i.e., the first phase coder-decoder according to the present invention. The two arms of the first phase coder-decoder are polarization maintaining optical fiber optical paths. The DC phase modulator 606 is located on either arm of the two arms of the first phase coder-decoder.

Similarly, the polarization maintaining beam splitter 612, two reflecting devices with an orthogonal rotation of polarization 614 and 615, and two arms between the polarization maintaining beam splitter 612 and the two reflecting devices with an orthogonal rotation of polarization form a second polarization maintaining Michelson interferometer with unequal arms, i.e., a second phase coder-decoder according to the present invention. The two arms of the second phase coder-decoder are polarization maintaining optical fiber optical paths. The DC phase modulator 613 is located on either arm of the two arms of the second phase coder-decoder.

Hereinafter, an exemplary description of the codec apparatus of FIG. 6 is given, with the codec apparatus used for decoding taken for example.

One of two ports 601 and 602 on one side (the left side in FIG. 6) of the pre beam splitter 603 is used as an input port of the apparatus. A first port A and a second port B of the optical circulator 604 are connected to one output port of the pre beam splitter 603 and one input port of the polarization maintaining beam splitter 605 respectively. An optical pulse input to the first phase coder-decoder, after being decoded, is output by one output port 609 of the polarization maintaining beam splitter 605, or transmitted to port B of the optical circulator 604 via another output port of the polarization maintaining beam splitter 605 (i.e., the one input port of the polarization maintaining beam splitter 605) and output from a third port C of the optical circulator 604. A first port A and a second port B of the optical circulator 611 are connected to another output port of the pre beam splitter 603 and one input port of the polarization maintaining beam splitter 612 respectively. An optical pulse input to the second phase coder-decoder, after being decoded, is output by one output port 616 of the polarization maintaining beam splitter 612, or transmitted to port B of the optical circulator 611 via another output port of the polarization maintaining beam splitter 612 (i.e., the one input port of the polarization maintaining beam splitter 612) and output from a third port C of the optical circulator 611.

In operation, an optical pulse enters the beam splitter 603 via the port 601 or 602 of the beam splitter 603 and is split into a first optical pulse and a second optical pulse by the beam splitter 603. The first optical pulse is input via port A of the optical circulator 604 and output to the polarization maintaining beam splitter 605 by port B of the optical circulator 604. The polarization maintaining beam splitter 605 splits the input first optical pulse into two first sub optical pulses. One first sub optical pulse, after undergoing a phase modulation performed by the DC phase modulator 606, is reflected back by the reflecting device with an orthogonal rotation of polarization 607, and another first sub optical pulse is directly transmitted to the reflecting device with an orthogonal rotation of polarization 608 via a polarization maintaining optical fiber and reflected back by the reflecting device with an orthogonal rotation of polarization 608. The two first sub optical pulses with a relative time delay applied thereto that are reflected back are combined by the polarization maintaining beam splitter 605, and then output by the port 609, or output to port B of the optical circulator 604 and transmitted to port C and output by a port 610. The second optical pulse is input via port A of the optical circulator 611 and output to the polarization maintaining beam splitter 612 by port B of the optical circulator 611. The polarization maintaining beam splitter 612 splits the input second optical pulse into two second sub optical pulses. One second sub optical pulse, after undergoing a phase modulation performed by the DC phase modulator 613, is reflected back by the reflecting device with an orthogonal rotation of polarization 614, and another second sub optical pulse is directly transmitted to the reflecting device with an orthogonal rotation of polarization 615 via a polarization maintaining optical fiber and reflected back by the reflecting device with an orthogonal rotation of polarization 615. The two second sub optical pulses with a relative time delay applied thereto that are reflected back are combined via the polarization maintaining beam splitter 612, and then output by the port 616, or output to port B of the optical circulator 611 and transmitted to port C and output by a port 617. The DC phase modulators 606 and 613 cause a DC phase modulation performed by one of the first phase coder-decoder and the second phase coder-decoder to differ from a DC phase modulation performed by the other by 90 degrees.

Next, an exemplary description of the codec apparatus of FIG. 6 is given, with the codec apparatus used for encoding taken for example.

One port 609 of the polarization maintaining beam splitter 605, the third port C of the optical circulator 604, one port 616 of the polarization maintaining beam splitter 612, and the third port C of the optical circulator 611 are used as input ports of the apparatus. The first port A and the second port B of the optical circulator 604 are connected to one port of the pre beam splitter 603 and another port of the polarization maintaining beam splitter 605 respectively. An optical pulse input from the third port C of the optical circulator 604 is input to the first phase coder-decoder via the second port B of the optical circulator 604. Optical pulses input from the one port 609 of the polarization maintaining beam splitter 605 and the third port C of the optical circulator 604, after being encoded by the first phase coder-decoder, are output to the second port B of the optical circulator 604 by the polarization maintaining beam splitter 605 and transmitted to the pre beam splitter 603 by the first port A of the optical circulator 604. The first port A and the second port B of the optical circulator 611 are connected to another port of the pre beam splitter 603 and another port of the polarization maintaining beam splitter 612. An optical pulse input from the third port C of the optical circulator 611 is input to the second phase coder-decoder via the second port B of the optical circulator 611. Optical pulses input from the one port 616 of the polarization maintaining beam splitter 612 and the third port C of the optical circulator 612, after being encoded by the second phase coder-decoder, are output to the second port B of the optical circulator 611 by the polarization maintaining beam splitter 612 and transmitted to the pre beam splitter 603 by the first port A of the optical circulator 611. One of the two ports 601 and 602 on one side (the left side in FIG. 6) of the pre beam splitter 603 is used as an output port of the apparatus. Optical pulses input by the one port 609 of the polarization maintaining beam splitter 605, the third port C of the optical circulator 604, the one port 616 of the polarization maintaining beam splitter 612, and the third port C of the optical circulator 611, after being encoded, realize four kinds of phase encoding respectively, and the encoded optical pulses are combined via the beam splitter 603 and then output by the port 601 or 602.

Figure 7:
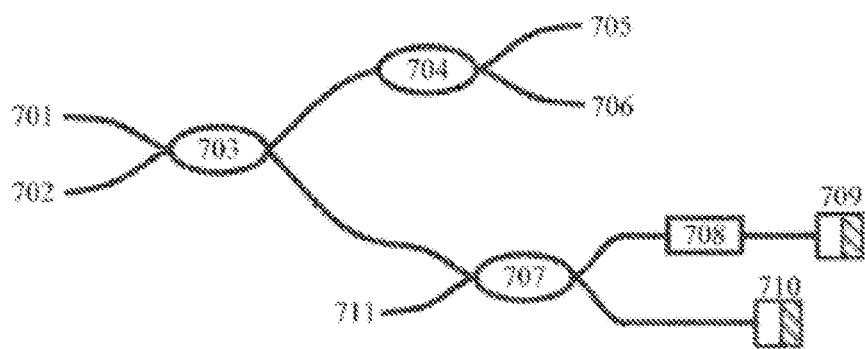
FIG. 7 is a schematic diagram of composition and structure of a time-bin phase codec apparatus for quantum key distribution based on reflection with an orthogonal rotation of polarization of a preferred embodiment of the present invention.

A time-bin phase codec apparatus for quantum key distribution based on reflection with an orthogonal rotation of polarization that uses the phase coder-decoder of the present invention is as shown in FIG. 7, and comprises the following components: beam splitters 703 and 704, a polarization maintaining beam splitter 707, a phase modulator 708, and reflecting devices with an orthogonal rotation of polarization 709 and 710.

The polarization maintaining beam splitter 707, two reflecting devices with an orthogonal rotation of polarization 709 and 710, and two arms between the polarization maintaining beam splitter 707 and the two reflecting devices with an orthogonal rotation of polarization form a polarization maintaining Michelson interferometer with unequal arms, i.e., the phase coder-decoder according to the present invention. The two arms are polarization maintaining optical fiber optical paths. The phase modulator 708 is located on either arm of the two arms of the phase coder-decoder.

Hereinafter, an exemplary description of the codec apparatus of FIG. 7 is given, with the codec apparatus used for decoding taken for example.

The beam splitter 703 is used as a pre beam splitter, and one of two ports 701 and 702 on one side thereof is used as an input port of the apparatus. One optical pulse from the beam splitter 703 is split by the beam splitter 704 and then output by a port 705 or 706. An optical pulse input to the polarization maintaining Michelson interferometer with unequal arms, after being decoded, is output by a port 711.

In operation, an input optical pulse enters the beam splitter 703 via the port 701 or 702 of the beam splitter 703 and is split into two optical pulses via the beam splitter 703 for transmission. One optical pulse from the beam splitter 703 is input to the beam splitter 704, and is split by the beam splitter 704 and then output via the port 705 or 706 for time-bin decoding. Another optical pulse from the beam splitter 703 is input to the polarization maintaining beam splitter 707, and is split into two sub optical pulses by the polarization maintaining beam splitter 707. One sub optical pulse, after being modulated with a 0 degree phase or a 180 degrees phase randomly by the phase modulator 708, is reflected back by the reflecting device with an orthogonal rotation of polarization 709, and another sub optical pulse is directly transmitted to the reflecting device with an orthogonal rotation of polarization 710 via a polarization maintaining optical fiber and reflected back by the reflecting device with an orthogonal rotation of polarization 710. The two sub optical pulses with a relative time delay applied thereto that are reflected back are combined via the polarization maintaining beam splitter 707 and then output by the port 711.

Here, it should be noted that the beam splitter 704 is optional. It is possible that the above one optical pulse is directly output by the pre beam splitter 703 for time-bin decoding.

Next, an exemplary description of the codec apparatus of FIG. 7 is given, with the codec apparatus used for encoding taken for example.

The ports 705 and 706 of the beam splitter 704 and the port 711 of the polarization maintaining beam splitter 707 are used as input ports of the apparatus. Optical pulses input from the ports 705 and 706 are combined by the beam splitter 704 and then output to the pre beam splitter 703 to realize time-bin encoding. An optical pulse input from the port 711, after being encoded via the polarization maintaining Michelson interferometer with unequal arms, is output to the pre beam splitter 703 by the polarization maintaining beam splitter 707, during which two kinds of phase encoding are realized by modulating the phase modulator 708. One of the ports 701 and 702 of the pre beam splitter 703 is used as an output port of the apparatus. An optical pulse output by the beam splitter 704 and an optical pulse output by the polarization maintaining beam splitter 707 are combined by the beam splitter 703 and then output by the port 701 or 702.

The beam splitter 704 is optional, and it is possible to directly use the port of the beam splitter 703 which is connected with the beam splitter 704 as the input port for time-bin encoding.

Figure 8:
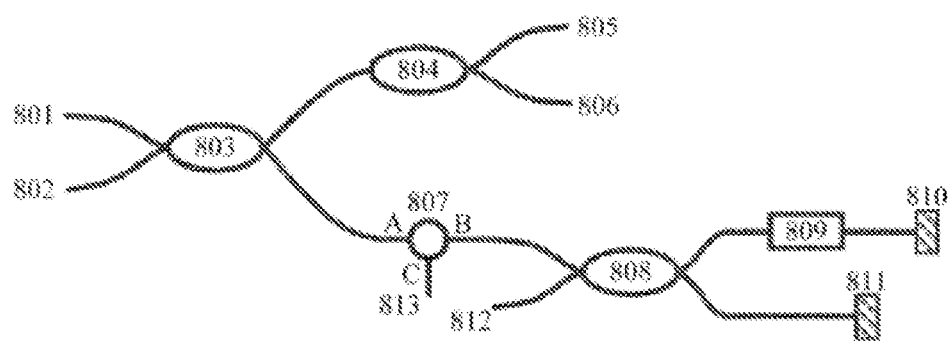
FIG. 8 is a schematic diagram of composition and structure of a time-bin phase codec apparatus for quantum key distribution using DC modulation based on reflection with an orthogonal rotation of polarization of a preferred embodiment of the present invention.

A time-bin phase codec apparatus for quantum key distribution using DC modulation based on reflection with an orthogonal rotation of polarization that uses the phase coder-decoder of the present invention is as shown in FIG. 8, and comprises the following components: beam splitters 803 and 804, an optical circulator 807, a polarization maintaining beam splitter 808, a DC phase modulator 809, and reflecting devices with an orthogonal rotation of polarization 810 and 811.

The polarization maintaining beam splitter 808, two reflecting devices with an orthogonal rotation of polarization 810 and 811, and two arms between the polarization maintaining beam splitter 808 and the two reflecting devices with an orthogonal rotation of polarization form a polarization maintaining Michelson interferometer with unequal arms, i.e., the phase coder-decoder according to the present invention. The two arms are polarization maintaining optical fiber optical paths. The DC phase modulator 809 is located on either arm of the two arms of the phase coder-decoder.

Hereinafter, an exemplary description of the codec apparatus of FIG. 8 is given, with the codec apparatus used for decoding taken for example.

The beam splitter 803 is used as a pre beam splitter, and one of two ports 801 and 802 on one side thereof is used as an input port of the apparatus. One optical pulse from the beam splitter 803 is split by the beam splitter 804 and then output by a port 805 or 806. An optical pulse input from a first port A of the optical circulator 807 is output by a second port B of the optical circulator 807, and an optical pulse input from the second port B of the optical circulator 807 is output by a third port C of the optical circulator 807. An optical pulse input to the polarization maintaining Michelson interferometer with unequal arms, after being decoded, is output by a port 812, or transmitted to the second port B of the optical circulator 807 via another output port of the polarization maintaining beam splitter 808 and output from the third port C of the optical circulator 807 and then output by a port 813.

In operation, an input optical pulse enters the beam splitter 803 via the port 801 or 802 of the beam splitter 803 and is split into two optical pulses by the beam splitter 803 for transmission. One optical pulse from the beam splitter 803 is input to the beam splitter 804, and split by the beam splitter 804 and then output by the port 805 or 806 for time-bin decoding. Another optical pulse from the beam splitter 803 is input via the first port A of the optical circulator 807 and output to the polarization maintaining beam splitter 808 from the second port B of the optical circulator 807. The polarization maintaining beam splitter 808 splits the another optical pulse into two sub optical pulses. One sub optical pulse, after being modulated with a 0 degree phase or a 180 degrees phase by the DC phase modulator 809, is reflected back by the reflecting device with an orthogonal rotation of polarization 810, and another sub optical pulse is directly transmitted to the reflecting device with an orthogonal rotation of polarization 811 via a polarization maintaining optical fiber and reflected back by the reflecting device with an orthogonal rotation of polarization 811. The two sub optical pulses with a relative time delay applied thereto that are reflected back are combined via the polarization maintaining beam splitter 808, and then output by the port 812, or transmitted to the second port B of the optical circulator 807 and output by the third port C of the optical circulator 807 and then output by the port 813.

Here, it should be noted that the beam splitter 804 is optional. It is possible that the above one optical pulse is directly output by the pre beam splitter 803 for time-bin decoding.

Next, an exemplary description of the codec apparatus of FIG. 8 is given, with the codec apparatus used for encoding taken for example.

The ports 805 and 806 of the beam splitter 804, the port 812 of the polarization maintaining beam splitter 808, and the third port C of the optical circulator 807 are used as input ports of the apparatus. An optical pulse input from the third port C of the optical circulator 807 is output by the second port B of the optical circulator 807, and an optical pulse input from the second port B of the optical circulator 807 is output by the first port A of the optical circulator 807. Optical pulses input from the ports 805 and 806 are combined by the beam splitter 804 and then transmitted to the pre beam splitter 803 to realize time-bin encoding. An optical pulse input from the port 812 and an optical pulse input by the third port C of the optical circulator 807 and output to the polarization maintaining beam splitter 808 by the second port B of the optical circulator 807, after being encoded via the polarization maintaining Michelson interferometer with unequal arms, are output to the second port B of the optical circulator 807 by the polarization maintaining beam splitter 808 and transmitted to the pre beam splitter 803 via the first port A of the optical circulator 807. Optical pulses input by the port 812 of the polarization maintaining beam splitter 808 and the third port C of the optical circulator 807, after being encoded, realize two kinds of phase encoding respectively. One of the ports 801 and 802 of the beam splitter 803 is used as an output port of the apparatus. An optical pulse output by the beam splitter 804 and an optical pulse output from the first port A of the optical circulator 807 are combined by the beam splitter 803 and then output by the port 801 or 802.

The beam splitter 804 is optional, and it is possible to directly use the port of the beam splitter 803 which is connected with the beam splitter 804 as the input port for time-bin encoding.

Although phase modulator(s) is shown in FIGS. 1 to 2 and FIGS. 6 to 8, it is possible that the phase coder-decoder and the codec apparatus of the present invention do not comprise a phase modulator.

Herein, the terms "beam splitter" and "beam combiner" may be used interchangeably, and a beam splitter may also be referred to as and used as a beam combiner, and vice versa. Herein, a "polarization maintaining optical fiber optical path" refers to an optical path that uses a polarization maintaining optical fiber to transmit an optical pulse or an optical path formed by connecting polarization maintaining optical fibers.

The phase coder-decoder based on reflection with an orthogonal rotation of polarization or the corresponding codec apparatus of the present invention as described above may be configured at a receiving end of a quantum key distribution system for decoding. In addition, the phase coder-decoder based on reflection with an orthogonal rotation of polarization or the corresponding codec apparatus of the present invention as described above may also be configured at a transmitting end of the quantum key distribution system for encoding. For the phase coder-decoder or the corresponding codec apparatus of the present invention, when used at the receiving end or the transmitting end of the quantum key distribution system, it may comprise the phase modulator(s) as exemplarily described above in conjunction with FIGS. 1 to 2 and FIGS. 6 to 8 or may not comprise a phase modulator. In addition, in the case where both the receiving end and the transmitting end of the quantum key distribution system use the phase coder-decoder or the codec apparatus of the present invention, the phase coder-decoder or the codec apparatus for at least one of the receiving end and the transmitting end may comprise phase modulator(s).

Through the description of the specific embodiments, it should be possible to have a more in-depth and concrete understanding of the technical means adopted by the present invention to achieve the intended purpose and the effects thereof; however, the appended drawings are provided only for reference and explanation, and are not for limiting the present invention.

What is claimed is:

1. A phase coder-decoder for quantum key distribution, comprising:
   a beam splitter; and
   two reflecting devices optically coupled with the beam splitter via two arms, respectively, each of the reflecting devices including a reflecting device with an orthogonal rotation of polarization, and at least one of the two reflecting devices comprising a polarization beam splitter having an input port and two output ports, and being coupled to a corresponding arm of the two arms via the input port of the polarization beam splitter, wherein the two output ports of the polarization beam splitter of each of the at least one of the two reflecting device comprising the polarization beam splitter are optically coupled to each other via a transmission optical path, and wherein the transmission optical path for at least one reflecting device comprising a polarization beam splitter is formed by a polarization maintaining optical fiber that is twisted by 90 degrees, such that optical pulses output by the two output ports of its polarization beam splitter are both coupled to a same axis of the polarization maintaining optical fiber for transmission;
   wherein a phase difference of an x polarization state of an input optical pulse as a result of being transmitted by the two arms in a process of beam splitting by the beam splitter to beam combining by the beam splitter is exactly equal to a phase difference of a y polarization state of the optical pulse as a result of being transmitted the two arms in the process of beam splitting by the beam splitter to beam combining by the beam splitter.

2. The phase coder-decoder according to claim 1, wherein the two reflecting devices include reflecting devices with an orthogonal rotation of polarization that are the same in structure.

3. The phase coder-decoder according to claim 1, wherein the two reflecting devices include reflecting devices with an orthogonal rotation of polarization that are different in structure.

4. The phase coder-decoder according to claim 1, wherein the same axis of the polarization maintaining optical fiber is a slow axis of the polarization maintaining optical fiber.

5. The phase coder-decoder according to claim 1, wherein the same axis of the polarization maintaining optical fiber is a fast axis of the polarization maintaining optical fiber.

6. The phase coder-decoder according to claim 1, wherein the polarization maintaining optical fiber that is twisted by 90 degrees comprises a polarization maintaining optical fiber that is twisted by (90+n*180) degrees, where n is an integer.

7. The phase coder-decoder according to claim 1, wherein the beam splitter includes a polarization maintaining beam splitter.

8. The phase coder-decoder according to claim 1, wherein each of the two arms includes a polarization maintaining optical path, and optical devices on the two arms include polarization maintaining optical devices.

9. The phase coder-decoder according to claim 1, wherein the phase coder-decoder further comprises one or more phase modulators, wherein the one or more phase modulators is provided on at least one of the two arms.

10. A quantum key distribution system, comprising:
a phase coder-decoder for quantum key distribution, provided on a receiving end of the quantum key distribution system for decoding,
wherein the phase coder-decoder for quantum key distribution comprises:
a beam splitter; and
two reflecting devices optically coupled with the beam splitter via two arms, respectively, each of the reflecting devices including a reflecting device with an orthogonal rotation of polarization, and at least one of the reflecting devices comprising a polarization beam splitter having an input port and two output ports, and being coupled to a corresponding arm of the two arms via the input port of the polarization beam splitter, wherein the two output ports of the polarization beam splitter of each of the least one of the two reflecting device comprising the polarization beam splitter are optically coupled to each other via a transmission optical path, and wherein the transmission optical path for at least one reflecting device comprising a polarization beam splitter is formed by a polarization maintaining optical fiber that is twisted by 90 degrees, such that optical pulses output by the two output ports of its polarization beam splitter are both coupled same axis of the polarization r maintaining optical fiber for transmission;
wherein a phase difference of an x polarization state of an input optical pulse as a result of being transmitted by the two arms in a process of beam splitting by the beam splitter to beam combining by the beam splitter is exactly equal to a phase difference of a y polarization state of the optical pulse as a result of being transmitted by the two arms in the process of beam splitting by the beam splitter to beam combining by the beam splitter.

11. A quantum key distribution system, comprising:
a phase coder-decoder for quantum key distribution, provided on a transmitting end of the quantum key distribution system for encoding,
wherein the phase coder-decoder for quantum key distribution comprises:
a beam splitter; and
two reflecting devices optically coupled with the beam splitter via two arms, respectively, each of the reflecting devices including a reflecting device with an orthogonal rotation of polarization, and at least one of the two reflecting devices comprising a polarization beam splitter having an input port and two output ports, and being coupled to a corresponding arm of the two arms via the input port of the polarization beam splitter, wherein the two output ports of the polarization beam splitter of each of the at least one of the two reflecting device comprising the polarization beam splitter are optically coupled to each other via a transmission optical path, and wherein the transmission optical path for at least one reflecting device comprising a polarization beam splitter is formed by a polarization maintaining optical fiber that is twisted by 90 degrees, such that optical pulses output by the two output ports of its polarization beam splitter are both coupled to a same axis of the polarization maintaining optical fiber for transmission;
wherein a phase difference of an x polarization state of an input optical pulse as a result of being transmitted by the two arms in a process of beam splitting by the beam splitter to beam combining by the beam splitter is exactly equal to a phase difference of a y polarization state of the optical pulse as a result of being transmitted by the two arms in the process of beam splitting by the beam splitter to beam combining by the beam splitter.

* * * * *